United States Patent [19]
Chen et al.

[11] Patent Number: 5,665,971
[45] Date of Patent: Sep. 9, 1997

[54] RADIATION DETECTION AND TOMOGRAPHY

[75] Inventors: Min Chen, Brookline, Mass.;
Alexander I. Bolozdynya, Hoffman Estates, Ill.

[73] Assignee: Massachusetts Institute of Technology, Cambridge, Mass.

[21] Appl. No.: 512,321

[22] Filed: Aug. 8, 1995

Related U.S. Application Data

[63] Continuation of Ser. No. 385,763, Feb. 8, 1995, abandoned, which is a continuation-in-part of Ser. No. 44,962, Apr. 12, 1993, abandoned.

[51] Int. Cl.$^6$ .......................... G01T 1/161; G01T 1/185; G01T 1/205
[52] U.S. Cl. .................... 250/385.1; 250/361 R; 250/363.03; 250/363.04; 250/366; 250/368
[58] Field of Search .......................... 250/361 R, 366, 250/368, 374, 385.1, 363.01, 363.04, 363.03

[56] References Cited

U.S. PATENT DOCUMENTS

| | | |
|---|---|---|
| 3,876,882 | 4/1975 | Todd . |
| 4,286,158 | 8/1981 | Charpak et al. ............... 250/385.1 X |
| 4,529,882 | 7/1985 | Lee . |
| 4,751,391 | 6/1988 | Eberhard et al. . |
| 4,833,327 | 5/1989 | Hart . |
| 4,857,737 | 8/1989 | Kamae et al. . |
| 4,931,653 | 6/1990 | Hamm et al. ............... 250/361 R X |
| 5,175,434 | 12/1992 | Engdahl . |

FOREIGN PATENT DOCUMENTS

| | | |
|---|---|---|
| 225627 | 6/1987 | European Pat. Off. . |
| WO 93/08484 | 4/1993 | WIPO . |
| WO 93/10472 | 5/1993 | WIPO . |
| WO 93/23769 | 11/1993 | WIPO . |

OTHER PUBLICATIONS

Fujeida, I., "Ring Type SPECT Apparatus", Patent Abstracts of Japan, 11(173):582 (Jun. 4, 1987).

Oi, J., "Ring Type SPECT Apparatus", Patent Abstracts of Japan, 11(173):582 (Jun. 4, 1987).

Ngoc, et al., "A Xenon High–Pressure Proportional Scintillation–Camera For X and gamma–ray Imaging", Nuclear Instruments and Methods, 172 (1980), pp. 603–608.

Bolozdynya, A., et al., "Calorimeters for Precise e/gamma/Jet Physics", pp. 58–74.

Everett, D. B., et al., "Gamma–Radiation Imaging System Based on the Compton Effect", PROC. IEE, vol. 124, No. 11 (Nov. 1977), pp. 995–1000.

Anderson, D. F., et al., "CsI and Some New Photocathodes", FERMILAB–Conf–93/128, Jun. 1993.

Akimov, D. Y., et al., "Condensed krypton scintillators", Nuclear Instruments & Methods, Vol. A327 (1993), pp. 155–158.

Chen, M., et al., "Hormogenous Scintillating LKr/Xe Calorimeters", Nuclear Instruments & Methods, Vol. A327 (1993), pp. 187–192.

Egorov, V. V., et al., "Electroluminescence Emission Gamma–Camera", Nuclear Instruments & Methods, Vol. 205 (1983), pp. 373–374.

M. Chen, et al., "A Precision e/gamma Detector Using LKr/Xe Scintillating Calorimeters and Hadron Blind Trackers for Heavy Ion and Hadron Colliders", Int'l Conf. on Liquid Radiation Detectors, etc., Apr. 7 –Apr. 10 1992.

Aprile, E., et al., "First Observation of the Scintillation of Liquid Xenon, Krypton and Argon with a CsI Photocathode", submitted to Physical Review Letters, Nov. 6, 1992.

(List continued on next page.)

Primary Examiner—Edward J. Glick
Attorney, Agent, or Firm—David N. Caracappa

[57] ABSTRACT

A nuclear or x-ray detector which utilizes Compton double-scattering of photons by radiation particles, followed by photoelectron absorption, to reconstruct the energy and direction of such particles.

29 Claims, 9 Drawing Sheets

OTHER PUBLICATIONS

Brechner, R.R., et al., "Interative Reconstruction of Electronically Collimated Spect Images", IEEE Transactions on Nuclear Science, 37(3):1328–1329, 1332 (Jun. 1990).

Martin, J.B., "A Ring Compton Scatter Camera for Imaging Medium Energy Gamma Rays", IEEE Transactions on Nuclear Science, 40(4) :972–973 (Aug., 1993).

Singh, M., "An Electronically Collimated Gamma Camera for Single Photon Emission Computed Tomography. Part I: Theoretical Considerations and Design Criteria," Medical Physics, 10(4) :421–427 (Jul./Aug. 1983).

Singh, M., et al., "Experimental Test–Object Study of Electronically Collimated SPECT", Journal of Nuclear Medicine, 31(2) :178–186 (Feb., 1990).

Singh, M. , et al., "An Electronically Collimated Gamma Camera for Single Photon Emission Computed Tomography. Part II: Image Reconstruction and Preliminary Experimental Measurements", Medical Physics, 10(4) :428–435 (Jul./Aug., 1983).

Martin, J.B., et al. "Imaging Multi–Energy Gamma–Ray Fields with a Compton Scatter Camera", date unknown.

Kamae, T., et al., "A New Method to Measure Energy, Direction, and Poloarization of Gamma Rays", Nuclear Instruments and Methods in Physics Research, A260 (1987), pp. 254–257.

Everett, D. B., et al., "A Prototype Gamma Camera Using the Compton Effect", Proceeding of the Conference on the Applications of Electronics in Medicine, Southampton, England, (6–8 Apr. 1976), pp. 371–378.

Zych, A. D., et al., "Large Area Double Scattering Telescope for Balloon–Borne Studies of Neutrons and Gamma Rays", IEEE Transactions on Nuclear Science, Vol. NS–22, Feb. 1975, pp. 605–610.

RADIATION DETECTION AND TOMOGRAPHY

RELATED APPLICATIONS

This is a continuation of U.S. application Ser. No. 08/385 763 filed Feb. 8, 1995 (abandoned), which is a continuation-in-part of International application Ser. No. PCT/US 94/03913 filed Apr. 8, 1994 (abandoned), which, in turn, is a continuation-in-part of U.S. application Ser. No. 08/044, 962, filed Apr. 12, 1993 (abandoned), each of which is incorporated herein by reference in their entirety.

BACKGROUND OF THE INVENTION

Tomographical imaging techniques have been developed to enhance images produced by conventional X-ray imaging. X-ray tomography blurs out undesirable images of superimposed structure to accentuate images of principal interest. In linear tomography the radiation source and the detector film are moved in opposite directions. The patient is placed on a metal structure that rotates about a pivot point or fulcrum. This fulcrum plane remains in focus while all other planes are blurred. Linear tomography does not permit differentiation of soft tissue or provide quantitative information of attenuation properties of tissues.

Computerized axial tomography (CAT) scanners overcome the limitations of linear tomography by rotating the source with respect to the patient and a plurality of fixed detectors arranged around the patient.

The result is an x-ray image that gives the illusion of three dimensionality. Because the CAT beam is rotated around the body, it can image organs that overlap and are therefore obscured under conventional x-rays or radiograms. By using several hundred x-ray detectors to produce one exposure, the CAT is an order of magnitude more sensitive to slight gradations in density than radiographs, which frequently do not allow the practitioner to distinguish between tissues of approximately the same density.

Another useful imaging technique is Positron Emission Tomography (PET).

In PET, image construction is based on the location and intensity of gamma rays emitted in the region of a neutron-poor isotope. Planar images formed by computer PET result from the reconstruction of attenuation corrected coincident pairs of 511 KeV gamma rays mapped at the body surface from injected positron-emitting tracers. Neutron-poor isotopes undergo radioactive decay by the process $P^+ \rightarrow N + e^+ + v$, where $P^+$ is a nuclear proton, N is a neutron, $e^+$ is a positron, an $v$ is a neutrino. A neutron-poor isotope, such as $^{11}C$ will undergo beta decay, in which a proton becomes a neutron and a positron and a neutrino are ejected from the nucleus. Within a short distance, the positron encounters an electron, upon which the two annihilate each other and give rise to a pair of gamma-ray photons that depart at an angle of about 180°, each carrying an energy of 0.511 MeV.

The gamma photon derived from the decay of the isotopes within the patient's body is sensed by a circumferential array of collimated detectors, the circumference of which is designed so that opposite members of the ring are coupled. A signal is recorded only when both members of the detector pair sense coincidental photons. By using a slight time difference in the activation of the detectors, one can locate the source of the photons on the basis of time-of-flight differences from an eccentrically positioned emitter. Data are fed into a computer which generates the image based on location and source intensity. Tissue attenuation is taken into account. Spatial resolution is about 0.5 cm. Only minute amounts of tracers are needed. The radiation dose is small.

PET is particularly adapted to kinetic analysis of physiologic and body chemical events, including blood volume, blood flow, consumption of oxygen and substrates and the distribution and occupancy of surface and intracellular receptors. In addition to imaging the distribution of injected positron-emitting tracers, PET imaging provides a means for measuring the presence and amount of such important biological substances as oxygen contained in tissue induced by in vivo activation during irradiation with protons or by photoneutron production ($O^{16}(\gamma,n)O^{15}$) during radiotherapy of tumors. The importance of increasing the dose to hypoxic regions in tumors is well known in radiobiology and this would provide the first practical means for a non invasive on line characterization of tissue oxygen levels.

Single-Photon Emission Computed Tomography (SPECT) completes the spectrum of commonly used medical radionuclide or X-ray imaging devices.

The basic principles of SPECT are very similar to x-ray CT. A transverse section is divided into a matrix of small volume elements or voxels. The radioactivity of each voxel is computed from projection data obtained from a 180° or full 360° scan around the patient. The projection data are obtained by translating and rotating arrays of multiple detectors (multidetector approach) or by rotating one or more scintillation cameras around the patient (camera-based approach).

U.S. Pat. No. 4,833,327, incorporated herein by reference, describes a radioisotopic imaging system in which thin and thick electronic collimation detectors are arrayed about a radiation source which emits gamma rays. The thick detectors fix the location of impingement of a stopped gamma ray. By measurement of the energy released, the deflection angle $\theta$ occurring at the thin detector is determined from the Compton scattering equation.

Most of these imaging techniques require the measurement of the angle of the emitted or transmitted particles, i.e. X-rays or photons so that one can not only detect the energy but the direction from which the energy came. This angle must be determined so that projection functions can be used to map the object. It is this direction dimension that generally requires movement of the detector or the source with respect to the object to be imaged.

Despite such advances, a need exists for an efficient and precise medical X-ray detector or radionuclide detector having high detection efficiency (and thus low doses) excellent energy resolution (to eliminate background from scattered gamma-rays), excellent direction and position resolutions (to pinpoint tumors), and one which is simple, reliable and easy to use.

Ideally, the device should be able to image the distribution of two or more tracers (x-, or gamma and positron-emitters) simultaneously, thereby permitting:

i. the spatio-temporal correlation of physiological and anatomical processes delineated by the different tracers.

ii. the spatio-temporal correlation of two or more physiological processes using different labeled compounds administered simultaneously.

iii. the spatial correlation of two or more anatomical structures using different labeled compounds administered simultaneously.

Present nuclear medicine imaging devices are limited to tracers in the energy region below 511 keV. Great benefit would be obtained if devices were available in which the upper range of imagable energy could be increased, as it would then be possible to image a number of biologically important elements. These include, but are not limited to, Na-24, K-42, Mg-28, Ca-47, Fe-59, Co-58, and -60, and Zn-65.

Present nuclear medicine imaging devices are limited in size and can only cover a small portion of the body. A detector which could cover the entire body surface which could be commercially realized would have an important role in medical diagnosis and radiation protection programs (for example, whole body counting to determine body burdens of accidentally ingested or in vivo activated radionuclides). Such a system could also play a significant role in body composition analysis, i.e., naturally occurring high energy radiations from K-40 could be quantitatively imaged, thereby providing a measure of regional lean body mass, which can not be measured with presently available systems. In addition, the amount of Ca-49, and N-15 induced following neutron activation for bone and protein mass determinations, could be established at much lower patient dose than is now possible.

Current concern regarding the potential hazards of ionizing radiation exposures requires continued attention to ways of decreasing radiation exposure while not compromising the diagnostic information needed for proper patient management. A device which is able to increase the fidelity of image data, while decreasing the dose to the patient, would be an important addition to presently available medical imaging technology.

SUMMARY OF THE INVENTION

A radiation detector is disclosed in which radiation, such as x-rays, gamma or other nuclear radiation, is detected. The incident radiation is scattered by collision with noble gas molecules and converted into scintillation and electrons at a first interaction point. The first interaction produces another radiation particle, such as a gamma ray, which, in turn, produces a second interaction with a molecule. This second interaction produces a second scintillation and electrons. The electrons of each interaction drift in a weak electric field region until they reach a high electric field gain region. The electrons are then multiplied by acceleration in the high electric field gain region, so as to collide with the noble gas molecules to produce UV photons, which, in turn, impinge on a windowless photocathode to produce photo-electrons. The current at the photocathodes is integrated to determine the energy of the incident radiation. The distribution of the cathode current determines the transverse position of each of the two interaction points (vertices). The scintillation is detected by PMT's adjacent to the weak field region. The time difference between receipt at the PMT's of this scintillation light and the receipt of the drift electrons determines the longitudinal distance of each interacting point. The measurement of the energies, and the transverse and longitudinal position of the two interaction points, are used to calculate the direction of the incident radiation.

The present invention in another aspect comprises a nuclear or X-ray detector formed of a chamber in which converter molecules in a medium are contained. The medium may be comprised of a liquid and/or a compressed gas or a solid of high atomic number (Z) molecules, such as, xenon or krypton. X-rays, gamma rays or other nuclear particles pass through a thin metal window and at some point $X_1Y_1Z_1$ interact with the converter molecules to produce scintillation, a scattered photon and recoil electrons upon collision with the converter molecules. In a Compton scattering event the scattered photon in turn collides with another molecule at point $Y_2Y_2Z_2$, is annihilated, and produces secondary electrons. The electrons initially drift in a weak-electric field region until they reach an amplification region. In the amplification region, an accelerating electric field is provided, which causes ionization of the converter molecules when struck by an electron. The ionized molecules emit UV photons (electroluminescence). The UV photons in turn produce photoelectrons when they strike a windowless photocathode, preferably formed of cesium iodine (CsI) located at the end of the amplification region field.

Scintillations are detected by a first array of photodetectors (PMTs) which are used for event triggering and supplemental energy and position analyses.

The total charge of the ionizations and the position of the charge center in a plane normal to the direction of drift is determined by the array CsI photodetectors and is the primary position and energy determination means. Localization of the vertices X, Y and Z in the direction of drift (Z direction) is achieved by determining the drift time. Ultimately the method determines the X,Y (by centroid analyses at the CsI photodetectors) and Z (by drift time analysis) points.

Since multiplication occurs before the electrons are converted into current, the quantum efficiency of the detector of the invention is much higher than in the crystal/photomultiplier tube-type detectors.

The Compton double scattering of photons by gamma rays, followed by photoelectron absorption, is detected to reconstruct the energy and direction of incoming rays/particles.

DETAILED DESCRIPTION OF THE INVENTION

Figure 1:
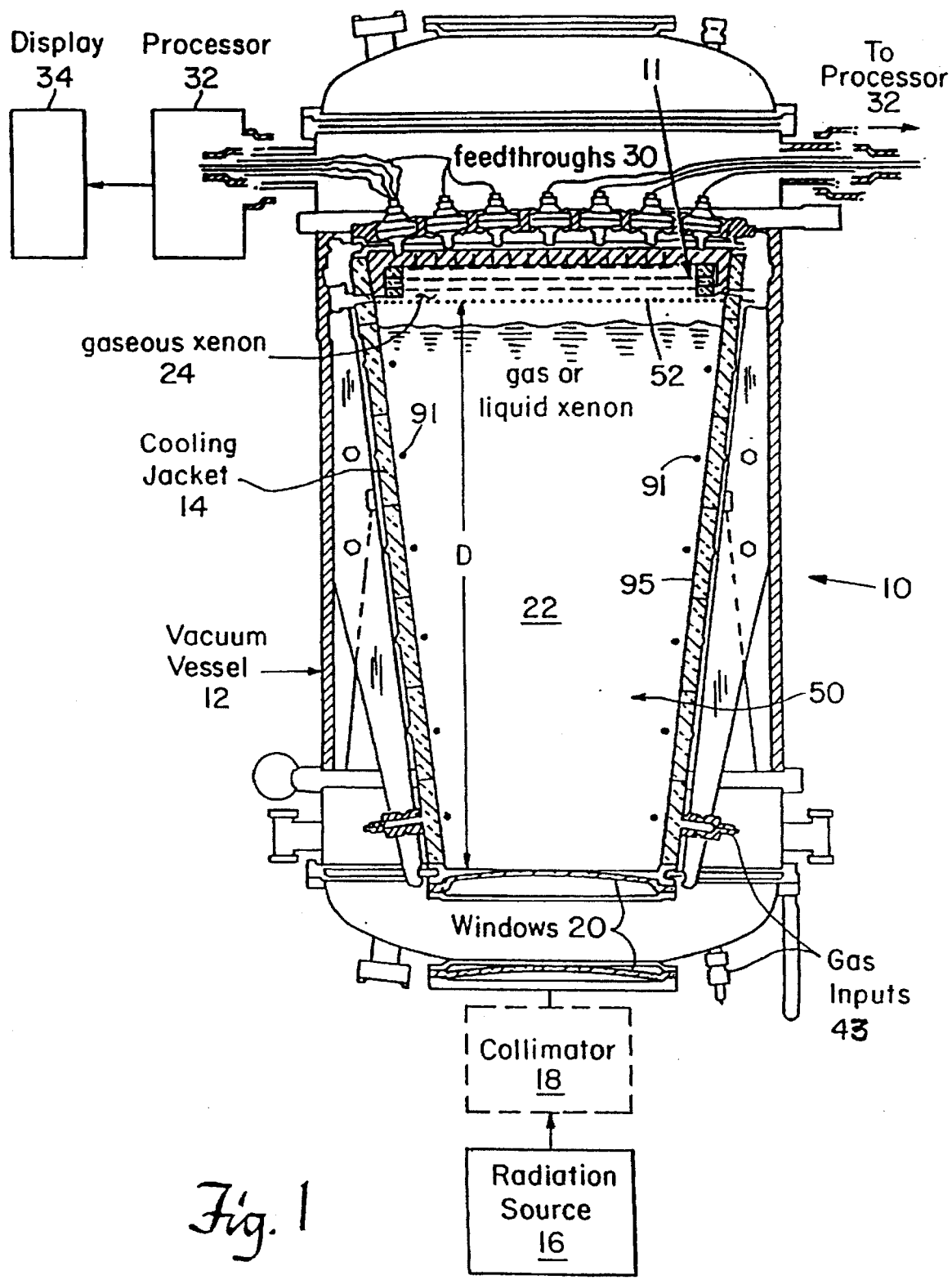
FIG. 1 is a schematic sectional view of a detector in accordance with the invention.

Referring now to FIG. 1 a preferred embodiment of the detector 10 of the invention will now be described in connection therewith. In this embodiment, the preferred converter molecules comprise krypton or xenon in a liquid, solid or gaseous state. Incoming radiation such as X-rays from a source 16 is optionally collimated in collimator 18 (shown in dotted lines) which may comprise an array of pin holes in a lead plate. The collimated, or uncollimated rays, pass through a pair of windows 20 formed at an entrance end of a detector chamber 50 formed of an outer vacuum vessel 12 and an inner cooling jacket 14.

Gas inputs 43 provided at one end of the chamber for the introduction of coolant to the vacuum vessel and converter gas to the inner chamber 22. Preferably, the converter gas is a noble, high Z gas, in this example, krypton or xenon having good scintillation properties.

For high energy particles, such as X-rays in the energy range of 0.5 to 5 MeV, liquid xenon or krypton is formed in chamber 22 to fully absorb the radiation particles. The liquid is formed by cooling the gas input in the volume labelled D. The volume D has a low electric field region formed by providing an electric field E1 between wire mesh electrode 52 and the entrance end of the chamber at windows 20. A voltage gradient is established within the chamber by providing an appropriate potential difference across electrodes 91 which extend concentrically adjacent to the inner wall 95 of the chamber. The vessel 12 is positioned vertically, as shown, and the liquid level of drift region D is adjusted in accordance with the desired ray absorption which is a function of the energy level of the incoming ray. The liquid region is separated from the gas gain region 11 by gravity.

Figure 2:
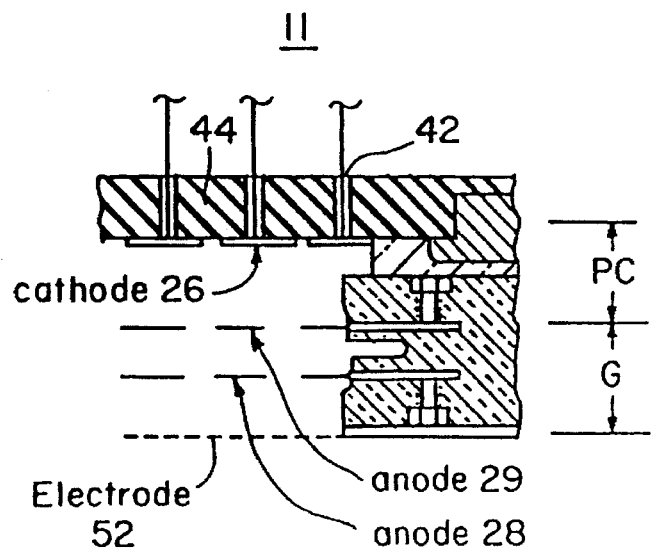
FIG. 2 is an enlarged partial section of FIG. 1 showing the details of the gain region of FIG. 1.

Electrons, produced by collision of incoming gamma ray energy with the gas or liquid molecules, drift in the weak E-field in volume D toward mesh electrode 52, which is at a low positive potential sufficient to make the electrons drift toward the electrode 52 in drift region D. Preferably a UV reflective coating of alumina is formed on wall 95 to form a UV mirror so as to increase the amount of light collected. The electrons are then amplified in a high E-field (of about 2000 volts per 3 mm, for example) in gain region G (See FIG. 2) formed between accelerating anode 28 and mesh electrode 52. Accelerating anode 28 causes the electrons to produce UV photons upon impact with the noble gas molecules in region G.

As an example, assuming a 140 KeV gamma input ray, each ray may produce 6500 primary electrons in drift region D with an E-field of 2 KV/cm. In region G, assuming an E-field of 27 Kv/40 atm, the light gain over a 3 mm gain region G is 1700 photons/electrons. The total light output is therefore $10^7$ UV photons, as compared with 2800 photons for a NaI crystal based system.

Of these $10^7$ photons, 30% enter photocathode region PC and hit the CsI photocathode 26. With a 40% quantum efficiency 1,200,000 photo-electrons are produced at cathode 26 and collected at anode 29. By calibration with a known standard the sum of all the CsI signals which are collected is equal to the energy of the incident radiation, $E_R$, which in this example is gamma ray energy $E_\gamma$. These signals are fed through leads 30 coupled to the back of each cathode 26 through opening 42 in cathode substrate 44 (See enlarged view of FIG. 2). Processor 32 receives the individual cathode signals and integrates them to determine the total energy. The position of the gamma ray is determined in processor 32 by calculating the centroid from the CsI cathodes 26 by inertial electron statistics. With appropriate Fano factor, i.e. (0.15 in xenon) and amplifier noise, the $\delta E/E$=FWHM Full Width Half Maximum is 2.1% at 140 KeV or a standard deviation $\sigma$ of 1% compared with 12% (FWHM) for NaI cameras. The energy and position of the sensed event is then displayed on an image device 34.

The detection efficiency can be further improved by eliminating the collimators. To do this, the system is operated in the double Compton scattering mode as described below.

Compton scattering, is the production of a gamma ray and a recoil electron from the collision of a gamma ray with an electron. Compton scattering dominates over the photon energy region between a few hundred to a few thousand KeV. A gamma ray scattered by collision with a molecule outside the detector may be incorrectly detected as a non-scattered photon at reduced energy levels. This is the region where conventional methods of measuring gamma rays do poorly because of the missing energy of the scattered photon. This is also the region where the double scattering method, in which a Compton scattered photon is absorbed by photo-electric effect, works the best. The precise measurements of the positions and energies of the recoil electrons gives a precise prediction of the positions and directions of the incoming photon.

Figure 3:
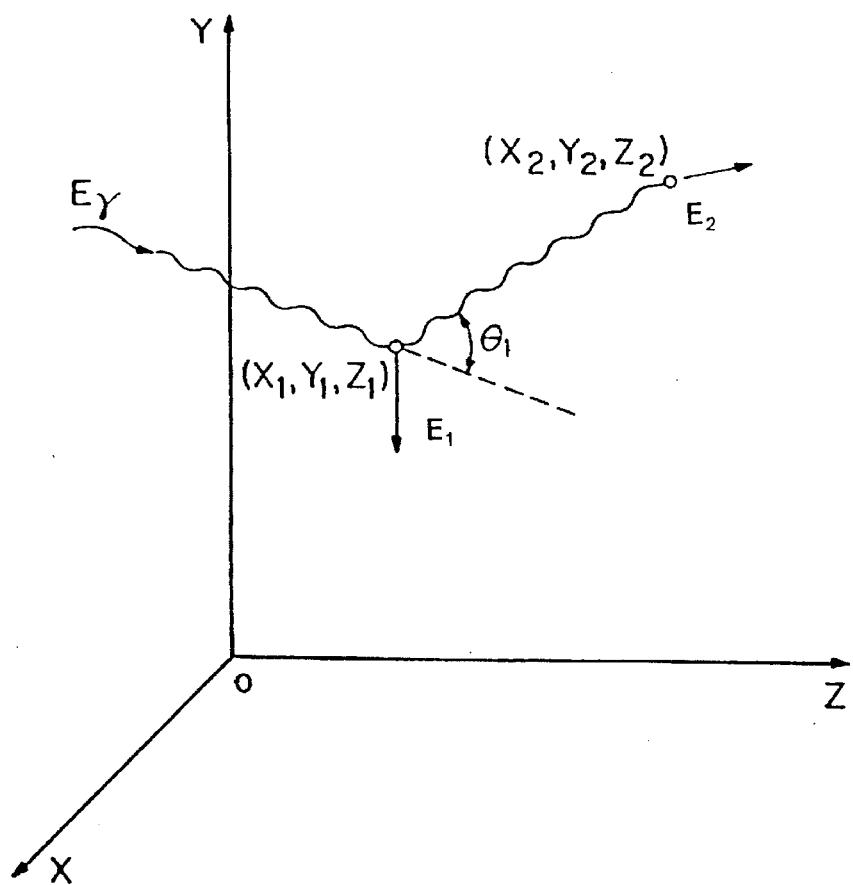
FIG. 3 is a schematic illustrating the geometry of Compton scattering.

As shown in FIG. 3, the incoming gamma ray $E_\gamma$ makes a Compton scattering at a depth $Z_1$ and position $X_1$, $Y_1$, causing an electron e1 to recoil with energy $E_1$ and a photon is scattered at angle $\theta_1$. The scattered photon is absorbed via photo-electron effect at a position $X_2$, $Y_2$, $Z_2$ causing a second electron e2 to recoil with energy $E_2$. The vertical positions of each scattering ($X_1$, $Y_1$ and $X_2$, $Y_2$) are determined by the centroid of the CsI cathode currents at times $t_1$ and $t_2$ respectively. The scattering also produces a fast scintillation light signal at $t_o$, which can be detected by CsI cathode 26 long before the arrival at $t_1$ and $t_2$ of the drift electrons at the photocathode 26. The depth position of each scattering ($Z_1$ and $Z_2$) is determined by timing the difference between the arrival time of the drifting electrons and the occurrence of the initial scintillation signal. Thus, $Z_1=(t_1-t_o)$ v, and $Z_2=(t_2-t_o)$ v, wherein v is the drift velocity (about one mm per microsecond) from which one can determine the angle $\theta_1$ as follows:

The energy of the incoming gamma-ray is the sum of the two recoiled electron energies:

$$E_\gamma = E_1 + E_2 \quad (1)$$

Note:
If there are more than two scatterings, the energy of the second scattering $E_1$ is replaced by $E_2+E_3+E_4+\ldots$.

A clean sample of double scattering events is accomplished by selecting events with $E_\gamma$ close to the expected photon energy, e.g. 511 KeV for the oxygen isotope $^{15}O_8$.

From Compton scattering formula, the scattered gamma angle $\theta_1$ is as follows:

$$\cos(\theta_1) = 1 - \frac{m_e(E\gamma - E_2)}{E_\gamma E_2} \quad (2)$$

where $E_2=E_2+E_3+E_4+\ldots$ in the event of more than two scattering events, and wherein $m_e$ is the mass of the electron. Thus the incoming gamma direction is defined by a cone with an opening angle $\theta_1$ from which the origin of the gamma rays can be located using the intercept of cones from different double Compton scattering events. Note that the opening angle $\theta_1$ decreases with increasing energy of the incoming gamma ray, and hence spatial resolution also increases with energy.

To simulate a 511 KeV gamma ray entering into a detector of compressed xenon gas of 40 atm, we used a Geant Monte Carlo program. We assumed the following electron energy and vertex position resolution:

$$\sigma(E)/E = 1\% \times \sqrt{140/E} \qquad (3)$$

where E is the electron energy in KeV.

Figure 4:
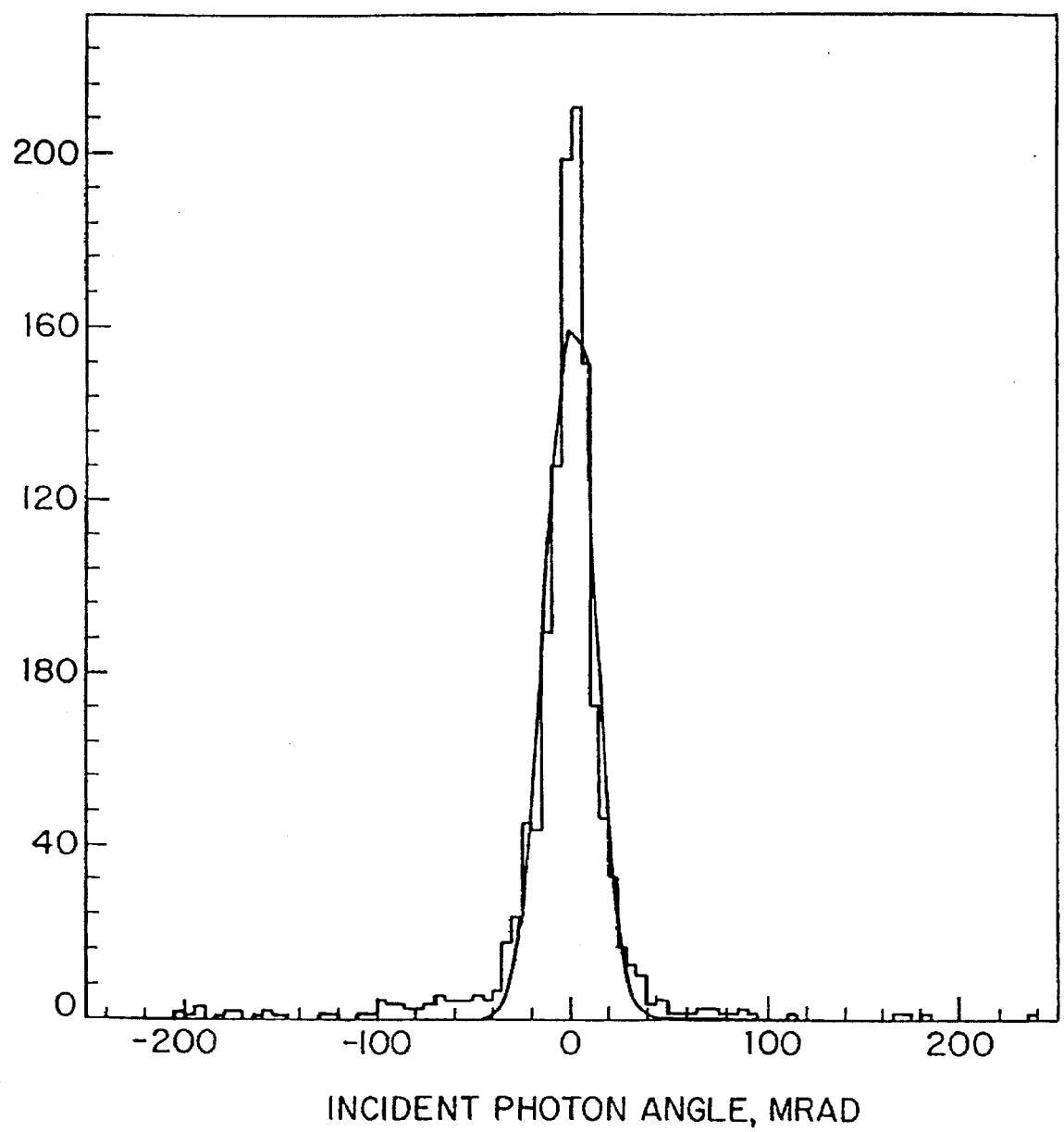
FIG. 4 is a plot of the number of events versus a reconstructed incident photon angle computer simulated for 511 KeV in 40 atm of Xe illustrating the precision in reconstructing the direction of incoming gamma rays using double scattered events in compressed gas.

Using Compton scattering formula we calculated the incident angle of the initial gamma ray. FIG. 4 shows the error in incident angle of the initial photon.

Both liquid and compressed xenon gas detectors in accordance with the invention have achieved a position resolution of 1.5 mm for a 60 KeV gamma. The liquid xenon detector (liquid in the drift region and gas in the amplification region) has achieved 6% (standard deviation) energy resolution for hundred KeV gamma rays. A compressed gas xenon detector has achieved 2% (standard deviation) energy resolution for 60 KeV gamma rays.

For medical imaging, excellent energy resolution is very important as this permits the rejection of events which Compton scatter in the patient and improves spatial resolution of the tumor. We note that the best energy resolution of conventional NaI cameras is typically around 12% FWHM, so the system of the invention is a considerable improvement. The important advantage gained by using the windowless CsI photocathodes, compared with conventional photo-tube systems, is the improved reliability due to the elimination of high pressure UV windows and PMT's as well as the improvement in detection efficiency and resolution resulting in part from the proximity of the cathodes to the energy sources and the ability to make photocathodes of fine granularity. CsI photocathodes have high quantum efficiency, can be made in very small sizes and are rugged and relatively inexpensive.

Figure 5:
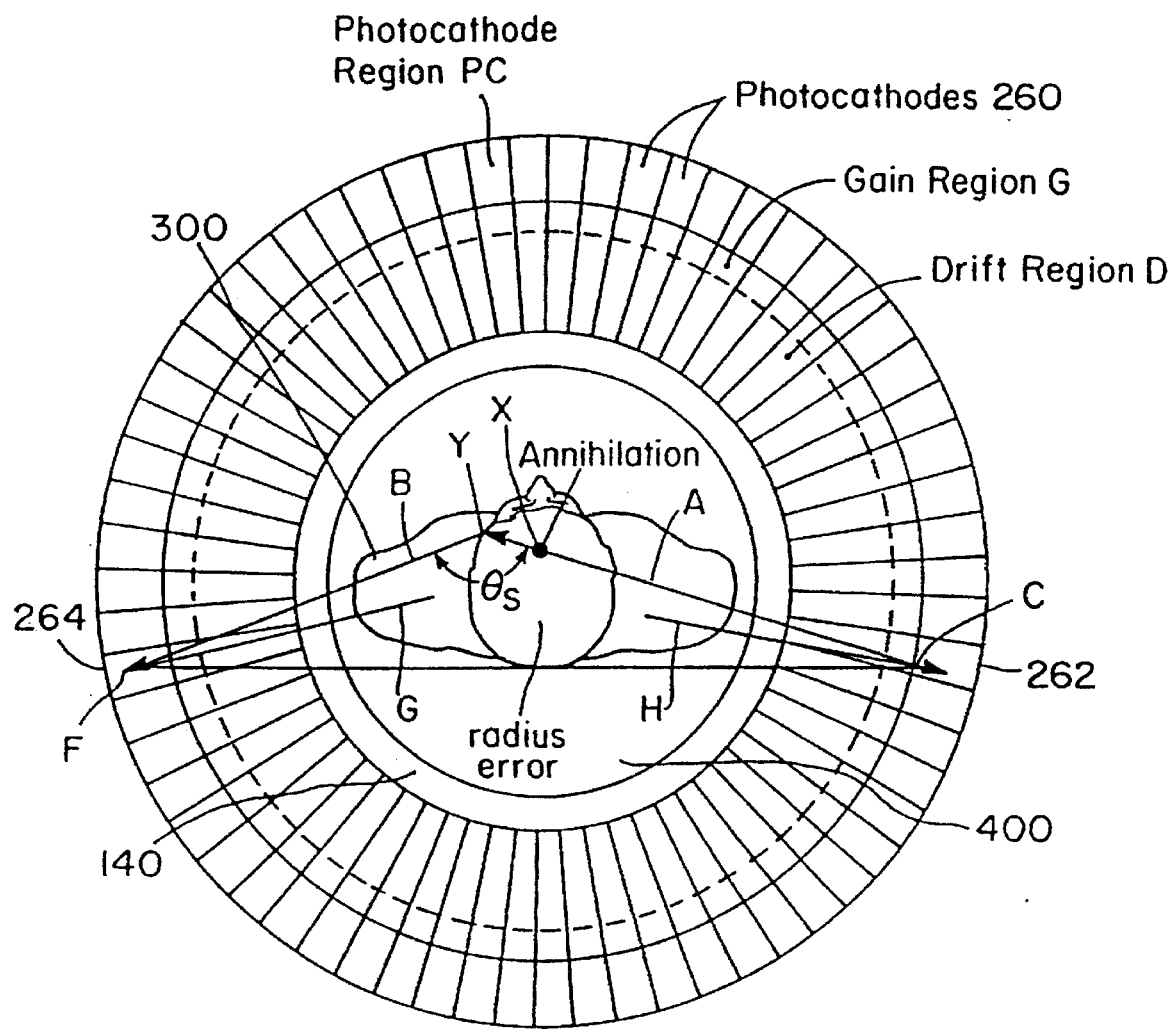
FIG. 5 is a schematic view of a detector of the invention as used to locate tumors in a patient.

FIG. 5 illustrates a PET application of the invention for detection of tumors in patients. In this embodiment a photocathode region PC formed of a partitioned annular array of CsI photocathodes and accelerating anodes for use in positron tomography 260 is provided around a gain region G formed, as in FIG. 1 of a tubular mesh electrode and tubular anodes and drift region D. Compressed xenon or krypton gas is provided in the tubular regions between cathode 260 and inner wall 140. A patient 300, having ingested a radioisotope such as oxygen $^{15}O_8$, is placed inside the tubular compartment 400. The isotope is preferentially absorbed by a tumor at point X and produces a positron emission which, in turn, results in the emission of two back-to-back 511 KeV gamma rays.

The two gamma rays, A and B, are emitted from positron annihilation at the tumor (point X). Ray A is unscattered and correctly detected at photocathode 262. Ray B is scattered at point Y by collision with molecules of the patient 300 and is detected by photocathode 264. The detector of the present invention has high energy resolution and can distinguish between the scattered and unscattered rays on the basis of energy levels. The scattered ray B gives up energy upon collision and will therefore have less energy than the unscattered ray A. The correct line or direction of Ray B (i.e. C-Y) can be reconstructed using the logic described below:

First, ray A, detected by photocathodes 262, is correctly identified as unscattered, since it has an energy level of at least 505 KeV.

The signals on the photocathodes 262 are used to reconstruct a cone of rays ACH.

The scattered ray collected at photocathodes 264 is correctly identified as scattered, since it has an energy level less than 505 KeV.

The signals on the photocathodes 264 are used to reconstruct a cone of rays BFG.

Cones ACH and GFB intercept at point Y, which is uniquely defined by the Compton scattering formulas previously described and Equation 5 below:

$$\text{angle } CYF = \theta_s = \pi - \cos^{-1}\left[1 - \frac{m_e E_B}{E_Y(E_Y - E_B)}\right], \qquad (5)$$

where $E_T = 511$ KeV and $E_B$ is the measured energy of $\gamma$-ray B.

Figure 7:
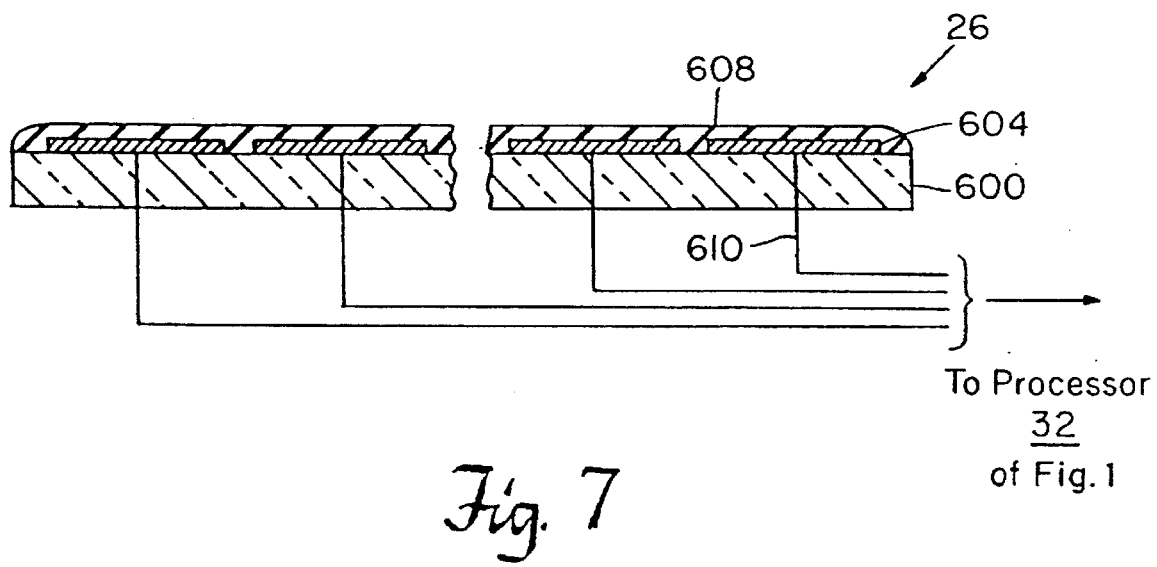
FIG. 7 is a schematic side view of a photocathode of the invention.

The CsI photocathode is preferably formed by an insulative substrate 600, formed of a ceramic or glass material, as shown in FIG. 7, upon which aluminum, gold, or silicon pads 604 are formed. The pads 604 may be as small as 4 mm by 4 mm, or less. Each pad 604 is coupled by a lead 610 extending through the substrate 600 to a processor 32. A 0.5 micron layer 608 of CsI is then formed over the pad structure by sputtering solid CsI material.

While the detector of the invention has been presented as a medical imaging device, other useful applications may be found, such as detection of explosive or drug material. Each material has its characteristic nuclear gamma rays and characteristic atomic spacing. Most explosives are formed of nitrogen which produces gamma rays of a known energy level (9.2 MeV) when subjected to x-ray, neutron, or electron radiation.

Figure 6:
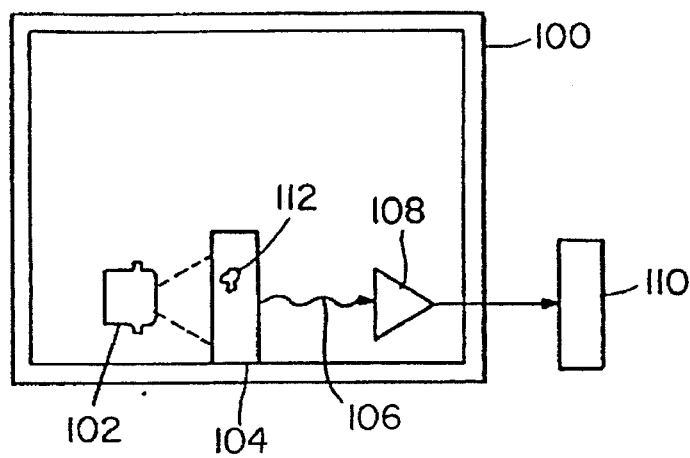
FIG. 6 is a schematic illustration of a detector of the invention used to determine the presence of explosives in a package.

FIG. 6 schematically illustrates such a system. In accordance with FIG. 6 a package 104 may be inspected for explosives by positioning it adjacent a source of x-rays 102. Incident x-rays which encounter explosives 112 produce gamma rays 106 at a characteristic energy level which are detected by a gamma detector 108 of the invention formed, as previously described, of a windowless photocathode immersed in a gaseous medium of a noble gas adjacent a gain region. The particles 106 are converted to electrons which are amplified by conversion to UV photons in the gain region. The photons produce photoelectrons in the photocathode. The total energy of the photoelectrons produced is an accurate measure of the energy of the incoming particle 106 and can be used to determine the explosive content of the package 104.

The detector 108 of the invention has large acceptance, excellent energy and direction resolutions, which facilitate the detection of the characteristic nuclear $\gamma$-rays emitted by specific materials under the excitation of incident neutrons, electrons or $\gamma$-rays. The detector can be used in the absorption mode, as shown in FIG. 6, by placing it opposite to the source 102 of incoming gamma rays. Alternatively, it can be used in a back scattered mode to detect back scattered $\gamma$-rays by placing it on the same side as the source 102 of incoming gamma-rays.

One can also use the detector 108 to detect the Bragg scattered gamma-rays to find the characteristic spacing, d, of the structure of the material of interest. We have: $d = \lambda/\sin\theta$, where $\lambda$ is the measured energy and $\theta$ is the measured angular position of the nth maximum of the scattered rays. The detector has excellent energy resolution (1%) and position resolution (1 mm) and can be made as large as needed to cover large angular regions, all of which are needed for drug or explosives detection.

Large detectors are needed to cover large acceptance. The detectors of the invention are limited in size only by the cost of the converter medium and the number of the electronics channels. The cost of electronics is decreasing rapidly with time. To reduce the cost of large detectors, it is possible to replace xenon with krypton as the converter. Krypton is about ten times cheaper and only a factor of 1.6 longer in absorption length than xenon.

Figure 8:
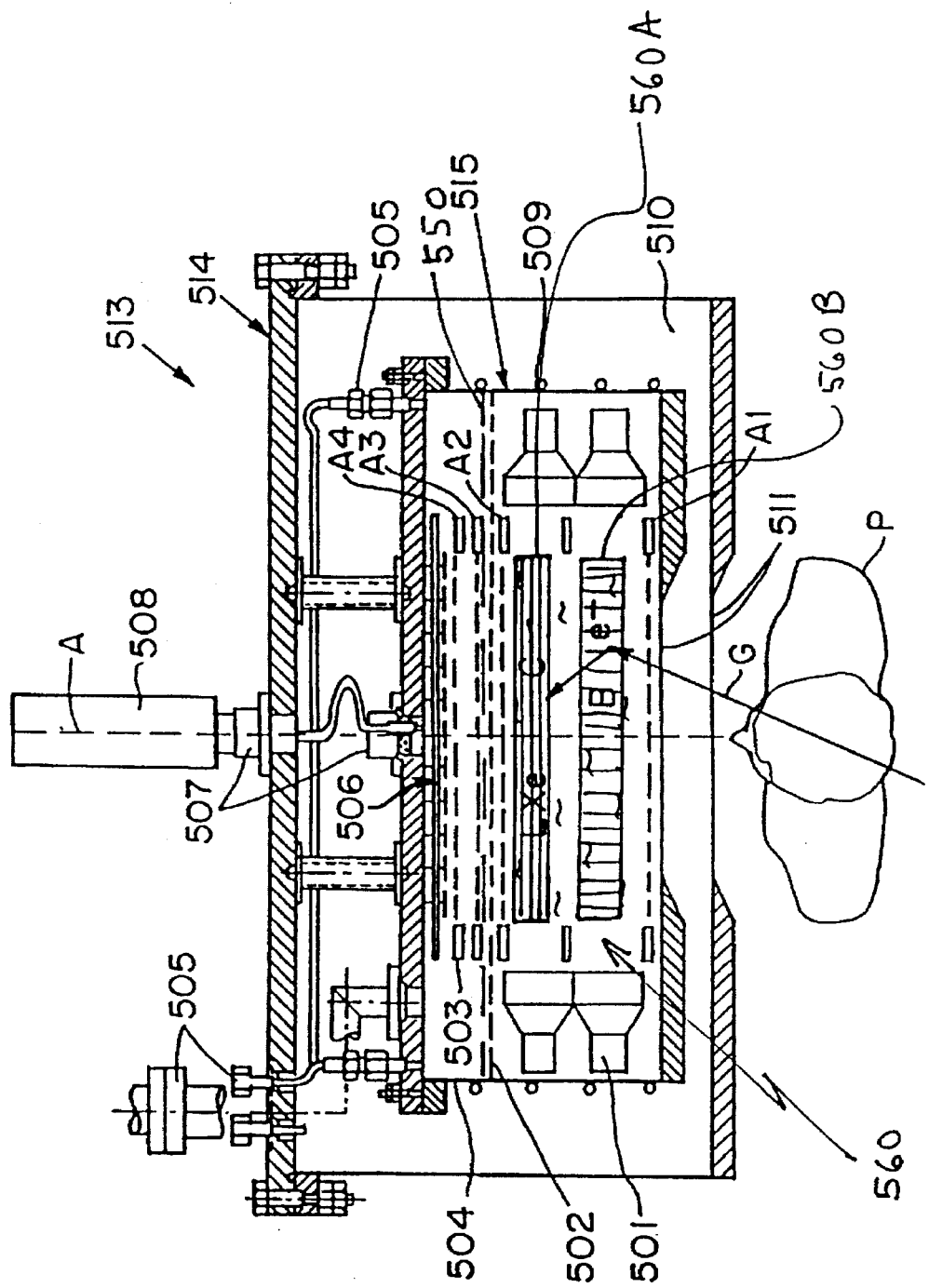
FIG. 8 is a schematic sectional view of SPECT embodiment of the invention.

Detection of double Compton scattering of photons followed by photoelectron absorption may also be used in SPECT applications as shown in FIG. 8. A liquid Xe SPECT apparatus in the form of a Scintillating Drift Chamber (SDC) 513 is illustrated therein. The SDC 513 comprises a cryostat housing 514 of the type described in connection with FIG. 1 having gas inputs 505 entrance windows formed of Al-coated carbon-fiber 511, an outer vacuum jacket or tank 510, a cooling element 509 and electrical feedthroughs 507. An inner liquid Xe chamber 515 is supported within housing 514 by an inner cylindrical wall 504. Chamber 515 contains an array of photo-multiplier tubes (PMT's) 501 immersed in the liquid Xe and encircling the liquid phase portion of the chamber below interphase surface 502. High voltage electrodes 503 are also distributed coaxially about a central axis "A" extending longitudinally through the chamber. These electrodes are used to shape the electrostatic field and extract electrons for detection. A planar array of CsI cathode detectors 506 is provided at one end of the chamber opposite windows 511 to detect UV light. An array of scintillation detectors 501, such as PMT's, is disposed on a side of the patient P opposite the windows 511 in housing 514. Optional light guides 560 are disposed opposite the PMT's to enhance the light collection efficiency of scintillation. Optional light collimators 550, such as glass microchannel plates formed with very small diameter capillaries, may be disposed adjacent electrodes A2 and A3 to separate the scintillator photodetectors PMT's 501 from the electro-luminescense detectors 506.

In operation, gamma rays (one ray of which is shown at G) from patient P pass through the front windows 511 and collide with Xenon atoms in the liquid Xe (LXe) at point B and are converted to primary electrons (e) and secondary electrons. The primary electrons produce fast scintillation light (not shown) which is detected at time ($t_0$) by the PMT's. Note: In addition to the shielding by the collimators 550, the PMT's are also shielded from the electroluminescence light produced by the secondary electrons since that light is refracted at an angle less than 45° to the LXe surface by the large index of refraction of LXe (1.6). Not all PMT's are capable of operating in an LXe ambient, so particular care must be taken in selecting an appropriate PMT. One such PMT is a glass PMT designated FEU-85, mentioned at p. 156 of "condensed Krypton Scintillators" by D. Yu Akimov et al., Nuclear Instruments and Methods in Physical Research, A327 (1993).

The secondary electrons drift in a low E-field provided by mesh electrodes A1–A2 until they reach an amplification region formed, for example, by a high E-field region (between A2 and A3) where they generate UV light in Xenon, i.e. electro-luminescence upon collisions with gas Xenon atoms and molecules. The UV photons in turn produce photoelectrons in the 2D array of CsI photodetectors 506. $A_4$ is an isolated wire electrode which is used to extract photo-electrons from the cathodes of detector 506. Centroid measurements taken at $A_4$ and detectors 506 give the X-Y position of the vertices of the incoming gamma ray (See FIG. 3.) The longitudinal (Z) position of the gamma ray G is determined by timing the difference $t_1$–$t_0$ where $t_1$ is the time of occurrence of luminescence and $t_0$ the time of occurrence of the initial scintillation signal as described in connection with FIG. 3.

The optional light guides 560 are preferably formed of optional 1 mm diameter fibers which absorb the scintillation light and re-emit light at longer wavelength. A fraction (about 10% efficiency) of the re-emitted light is trapped inside the fibers and travels to the photo-detectors, situated at the two ends of the fibers. The ratio of the amplitudes of the two photo-detectors determines the transverse coordinate of the Compton scattering vertices along the fibers. Two orthogonal arrays 560-A and 560-B of fibers can be used to obtain both transverse coordinates of the Compton scattering vertices, e.g., with the first array of fibers 560-A covering 50% of the area so that the second array 560-B, which has fibers running in a direction orthogonal to that of the first array, also receives 50% of the light and thus determines the second transverse coordinate. The weighted sum of correlated scintillation and electroluminescence signals gives the energy measurement. Using kinematics one can then determine which one of the multi-vertices is the first interaction vertex of the gamma ray.

In positron tomography, positrons emitted from isotopes such as $O^{15}$, are annihilated within an object to produce two back to back 511 KeV gamma ($\gamma$)-rays. A PET detector is used to measure the two $\gamma$-rays in coincidence in order to reconstruct the tomographic medical image.

The spatial resolution of PET scanners has improved rapidly over the last few years. The most frequently used detector configuration consists of several rings of scintillation crystals coupled to PMTs. The improvement in spatial resolution has been accomplished by increasing the number of scintillation crystals and associated electronics per detector ring. This increases the cost and complexity of the detectors dramatically. A typical state-of-art positron scanner with small BGO crystals consists of eight rings of detectors giving fifteen transverse section images with a slice thickness of 8 mm and an axial field of view of 12 cm.

Unfortunately, the sensitivity of these scanners is low due to the poor energy resolution of the crystals and the small acceptance in the axial angle. To take full advantage of the good spatial resolution, an increase in the detection efficiency and an improvement in the signal to noise ratio are required.

At present, there is a trend toward using BGO PET scanners with retractable septa to enable acquisition of all possible lines of response (3-D mode) in an effort to maximize the available number of detected events. However, the use of larger axial acceptance angles increases the fraction of scattered radiation considerably. This increases the noise in the image and imposes constraints on the count rate capability of the detector. It is clear that an increase in sensitivity of PET scanners with better spatial and energy resolution is highly desirable. Moreover, as will be shown below in connection with FIG. 9, the ability of an LXe PET to distinguish individual vertices of Compton scattered gamma rays in the detector can be used to change a significant fraction of background noise, due to Compton scattered gamma rays into useful data for proper imaging.

Figure 9A:
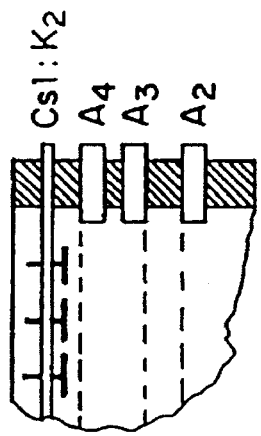
FIG. 9A is an enlarged view of a first portion of FIG. 9.
Figure 9B:
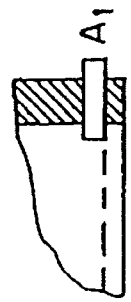
FIG. 9B is an enlarged view of a second portion of FIG. 9.
Figure 9:
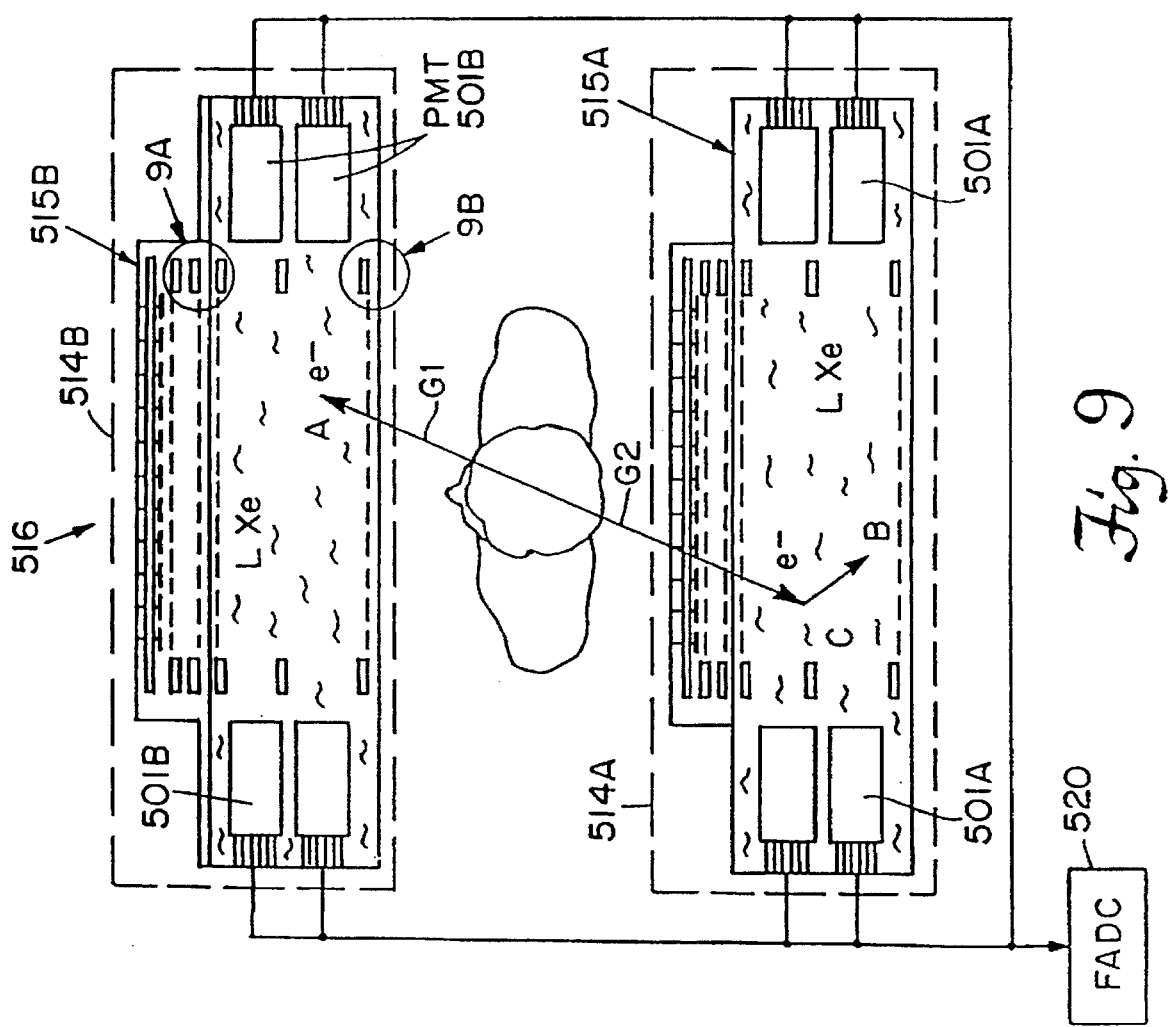
FIG. 9 is a schematic sectional view of a PET embodiment of the invention.

A schematic drawing of an LXe PET, in accordance with the invention, is shown in FIG. 9 with details illustrated in FIGS. 9A and 9B. Note: For simplicity, the cryostat housing and gas coupling lines etc. required (as in FIG. 8) are shown only as dotted lines 514A and 514B. The LXe PET consists of two LXe scintillation detectors 515A and 515B operating in coincidence by detecting scintillation bursts of two back-to-back 511 KeV $\gamma$-rays G1, G2. The X, Y and Z positions, or vertices, are defined at each detector in the manner described earlier for the LXe SDC of FIG. 8. To obtain the imaging projection we use the following methods:

First, the interaction vertices of the first two back-to-back 511 KeV $\gamma$-rays absorbed at each detector (for the case of both $\gamma$-rays not scattered inside the patient) are connected. Next, the point of scattering in the patient in the case of one $\gamma$-ray scattered in the patient and both $\gamma$'s scattered in the detectors is determined.

The data set of many such projections enables the reconstruction of the tomographic medical images using algorithms of focused tomography for longitudinal planes.

The fast Xe scintillation signal provides a trigger. For each event, the centroid positions in X and Y, and the total energy are independently measured by the scintillation light and drift electron signals. Thus, even though at high rate at any given time there can be several (i.e., 5 at 100 kHz) drifting electron clusters inside Xe for any given trigger, the electron clusters can be identified with the correct scintillation trigger using the above constraints.

The PET contains two rings of PMTs 501A, 501B submerged in liquid xenon to detect the scintillation light from absorbed gammas as shown in FIG. 9. The anode signals from PMTs, after pre-amplifying and shaping, are digitized with a fast analog to digital converter (FADC) 520 to provide the X, Y, and Z spatial and timing information and to avoid the digitization process from limiting the count rate performance.

The anode signals from the PMTs 501A, 501B are fed into fast (non-integrating) buffer amplifiers and then split into a fast and slow circuit. The fast signals from each PMT are summed to determine if a coincidence of direct scintillation light from top and bottom SDCs 515B, 515A has occurred. This coincidence signal is used as a strobe to trigger PMT FADCs 520 to digitize the outputs from spectroscopy amplifiers with the scintillation energy signals and to trigger CsI photocathode FADCs (not shown). The time difference between the scintillation burst and the electrons arriving at the gap A4-K2 (defined by UV light generated by electron clusters in the gap A2-A3) is determined.

In an LXe PET prototype with CsI pads, one-dimensional CsI photocathode pads of 30 cm length and 5 mm width will be used for X-position centroid measurements to simplify the electronics. In this case, the Y-positions of electron clusters are determined by ionization signal centroid measurements at separated group wires (strips) of the electrode anode A4. About 120 channel electronics with preamplifiers, shaping amplifiers, and FADCs may be required to measure the X-Y position and energy of γ-ray vertices. The advantage of such a readout system is the relatively small number of channels, though it will limit count rate capability of the SDCs.

The preferred LXe PET prototype will use a two-dimensional CsI-photocathode pad array consisting of 30×30 1 $cm^2$ pads. The signal summation will be restricted to CsI pads in the vicinity of the location of the electroluminescent burst in the gap A3-A4 for a local centroid calculation. At high count rates, local centroid calculation has the advantage that nearby positioned events in the LXe have a reduced effect on the estimated position.

Figure 11:
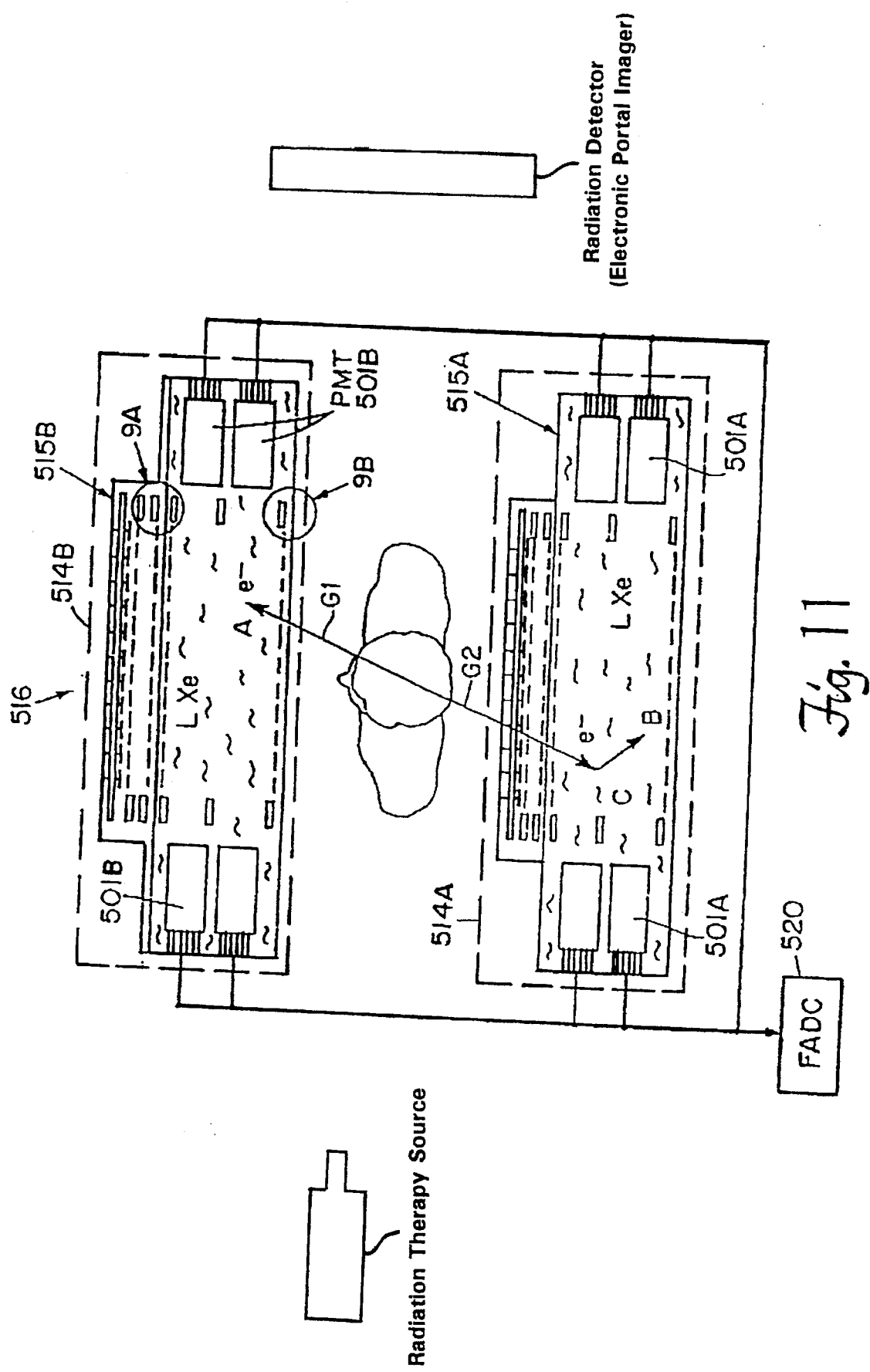
FIG. 11 is a schematic sectional view of a PET imaging system used to measure oxygen content in tumors.

A novel application of the PET imaging system illustrated in FIG. 9 is illustrated in FIG. 11. In order to determine the oxygen content of a tumor in a patient receiving radiotherapy, the transmitted activating therapy beam (proton accelerator or high energy gamma ray beam) is imaged in an in-line detector (as used as the portal imaging device for the particular radiotherapy application). The 511 KeV annihilation photons that are produced in the tumor region which decay with the half-life of oxygen-15 (123 sec) are a measure of the degree of the oxygen content, and thus the degree of hypoxia of the tumor.

There are two main sources of error for crystal PET detectors caused by Compton scattering either in the patient or in the detector.

Scattering in the patient: It occurs quite often (about 85% for a 15 cm diameter head) that one of the two gamma rays is scattered at a first point before being detected at a second point. This would lead to a reconstructed source position on a line other than a correct line. Events of this type and others in which more than one scattering process occurs, cause a halo of spurious background counts. Many of these can be suppressed by setting a lower limit on the energy deposited by the gamma ray in the detector. (The use of a septa collimator by most crystal PETs further deteriorate their sensitivity).

The present detector has substantially better energy resolution than any others used in PET and for this reason alone can restrict the halo to a very small amount, spread over a region two or three centimeters from the source resulting in the lower background. In addition, the ability to reconstruct multiple scattering vertices in the detector will permit the identification of most of the remaining halo events, permitting their suppression, or in some cases, the proper reconstruction of the source location.

The direction of a gamma ray is reconstructed up to an ambiguity of the azimuthal angle, i.e. lying in the surface of a cone with the half opening angle determined by Equation 2. The point where the firsts Compton scattering occurs serves as the apex of the cone, while the direction of the scattered gamma ray lies on the symmetry axis of the cone.

The azimuthal ambiguity is resolved by fixing the scattering angle of the ray to the value calculated using the measured energies and Equation 5. This information can be used to reconstruct SPECT images or enhance PET imaging. Scattering in the detector: About 85% of the remaining 15% of the events will have one of the two first Compton gammas scattered before being absorbed via photo electric effect in the detectors. In general, the energy of the gamma ray is deposited in successive collisions spread over several centimeters. Existing PET devices determine the center of this region as the effective impact point of the gamma ray. The present detector will, in most cases, permit reconstruction of the first scattering point and, therefore improved determination of the source location.

From the position and energy deposit of the first two vertices, a cone of possible incident gamma ray direction generally can be obtained. For scattering angles between about 60° to 120°, the order of the vertices may be a bit ambiguous, in which case two cones can be constructed with different (probability) weights. The distance of the closest approach of this cone (or both cones) to the vertex (or first vertex) in the other detector is determined. If this distance falls within the uncertainty of the calculation, the two points are accepted. In the case of dual cones, the choice can be confirmed by the energies deposited at the two vertices. If two or more vertices are identified in both detectors, the same fit is performed to both, increasing the confidence in the conclusion.

As previously noted, the LXe SDC can distinguish different scattering vertices and identify the first scattering vertex based on kinematics. An activity distribution is determined by reconstructing the longitudinal tomographic image using lines connecting the two vertices of the first scattering point on either side of the patient for individual events and reconstructing the point of scattering in the detector of one of the gamma rays.

Figure 10:
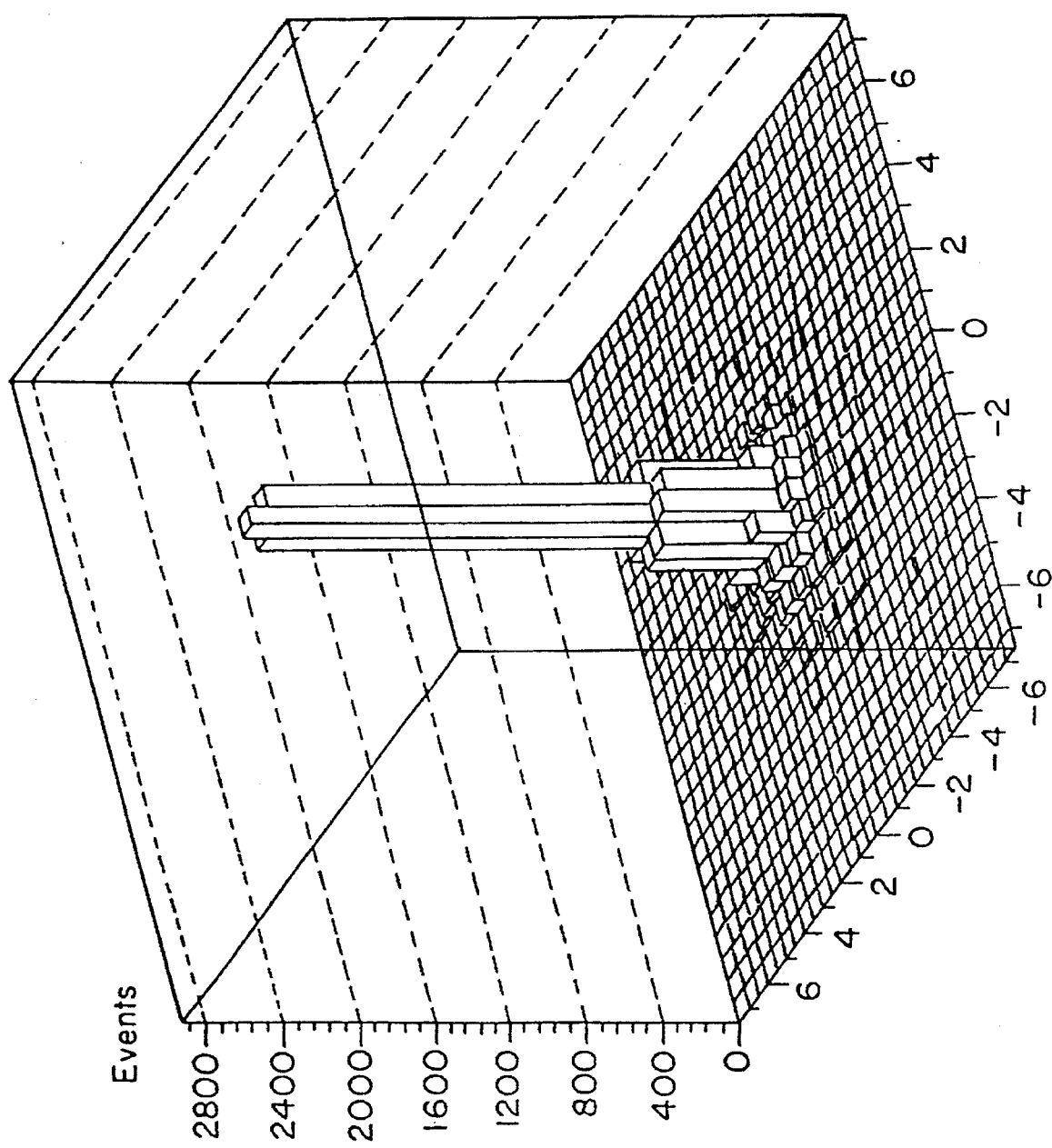
FIG. 10 is a reconstructed image of a point-like source inside a 15 cm. diameter head as detected by an LXe-PET.

A second method selects the first scattering event inside the LXe PET detector. In this second method, the events are analyzed using the process described below to select the correct first scattering vertex inside LXe. The two reconstructed first scattering points on either side 515A, 515B are connected and the closest approach to the source is computed. The result is shown in FIG. 10 which shows the point source precision of 2 mm.

The detailed process used to obtain the vertices of the first scattering inside the LXe's 515A, 515B for each of the two gamma rays G1, G2 is similar to that primarily described:

First, we require energy in either side to be above 495 KeV to select events with both gamma rays not interacting in the head (about 15% of the events). Secondly, we determine the first vertex using the measured energies of recoil electrons and the distances between them. The percentage of the remaining events, after the energy cut, for different number of scatterings in either chambers are tabulated as follows:

a) 4% for both gamma rays to be detected as single photo electric event: these are the "golden" events with well defined tumor position;

b) 36% for one single photo-electric event on one side in coincidence to a multiple scattering events at the opposite chamber. The vertex corresponding to the first scattering is defined by the following criteria:

If one of the recoil electron is above 340 KeV, it cannot be from the first scattering due to kinematics;

For Compton scattered events, if the distance between the two vertex >15 mm, the lower energy electron is likely to be from the first scattering;

If there are more than 2 scatterings, the vertex closest to the source (or vertices on the opposite side) is likely to be the first scattering.

The result of a GEANT Monte Carlo simulation shows the correct first scattering position for 73% of the events in this category can be obtained by this strategy.

c) 60% of the events are the type with multiple Compton scatterings in either chamber 514A or 514B. Using the method described in b), for one-half of the events one can obtain the correct 1st vertex for both sides. One can obtain projections by connecting first scatterings in both chambers and reconstruct longitudinal tomographic images by one of the preceding tomography methods.

| $\sigma(E)/E$, % | point source resolution, $\sigma$ in mm |
|---|---|
| 1.5 | 1.3 |
| 2.0 | 1.5 |
| 2.5 | 1.5 |
| 3.0 | 1.6 |
| 3.5 | 1.9 |
| 4.0 | 2.3 |

The above result of simulation for dx=0.5 mm shows that the expected energy resolution of 3.5% for an LXe-PET of the invention, is sufficient to obtain about 2 mm spatial precision.

From the foregoing, it will be seen that the detector of the invention has significantly improved efficiency, resolution both in space and energy, and is mechanically simpler than previous x-ray detectors. The cost to construct this device is expected to be a fraction of conventional PET and SPECT images. Because no collimators or large rotating housings are required, the detector is much less intimidating and claustrophobic than previous devices. Energy resolution is expected to be a few percent. Thus, it should be possible to image many isotopes simultaneously. Previous medical imaging systems, because they lacked sufficient energy resolution, could only image a single isotope at a time.

The detector uses a single medium, a noble liquid, to both amplify the signal coming from the isotope, and also to generate a secondary "clocking" signal, i.e., the scintillation signal. The spatial resolution of this system is expected to be about one mm, in contrast to several mm for previous systems. The higher efficiency achieved by eliminating the mechanical collimator reduces the amount of radionucleotide required in a typical PET or SPECT scan by about two orders of magnitude.

The detector is significantly different from previous x-ray detectors. A noble liquid (e.g., Xe) is in direct contact with the electronic (typically CsI) radiation detectors. A metal grid produces a voltage gradient inside the liquid.

This compact design, where the noble liquid serves a multiple purpose—as the converter, an amplifier and also a clock—accomplishes many things:

First, the noble liquid produces time-resolved data necessary to locate the scattering events (and ultimately the source of radiation) in three-dimensional space. Previous systems depended on knowing the position where the radiation first hits the detector and then drawing an imaginary line from that spot, through the collimator, back into an assumed spot where the radiation must have started. The spatial resolution of such a system is limited by mechanical constraints, such as the size of the hole in the collimator, and the spatial resolution of the detector. A collimator with fine holes reduces the efficiency by four orders of magnitude.

Second, because the liquid is in a voltage gradient, the recoil electron produced in the Compton scattering event produces a shower of UV photons as it travels to the CsI detector. This amplification effect explains the improved energy resolution, compared with crystals.

Equivalents

This completes the description of the preferred embodiments of the invention. It will be apparent to those skilled in the art, based upon the present description, that many modifications and variations may be made without departing from the scope of the present invention.

For example, while accelerating electrodes have been used to illustrate the amplification region, other means, such as multiple wire proportional wire chambers, may be used to perform a similar function. Likewise, photo-multipliers may be substituted for the CsI cathodes.

We claim:

1. Apparatus for detecting the incoming direction of incident radiation from which the origin of the radiation can be located comprising:

a) a detection chamber containing a volume of converter molecules, and wherein, upon collision of incident radiation with a molecule at a point $X_1Y_1Z_1$, a photon is produced which scatters at an angle $\theta_1$, along with a first recoil electron $e_1$ and initial scintillation light at time $t_0$, and wherein said photon, in turn, collides with another molecule at a point $X_2Y_2Z_2$, resulting in absorption of said photon and production of a second recoil electron $e_2$;

b) a first detector array exposed to said volume of molecules for determining $t_0$;

c) a second detector array exposed to said volume of molecules for detecting the time of arrival, of at least one of said first and second recoil electrons whereby said angle $\theta_1$ may be calculated and thus the incoming radiation direction; and d) a processor responsive to said first and second detector arrays for calculating said angle $\theta_1$.

2. The apparatus of claim 1 including a drift region between said second detector array and said points of collision where said electrons drift before being detected at the second detector array and wherein said first detector array is disposed adjacent said drift region.

3. The apparatus of claim 2 including a gain region between the drift region and the second detector array in which the recoil electrons are accelerated and collide with said molecules to produce UV photons which impinge on the second detector array to produce photoelectrons.

4. The apparatus of claim 1 wherein the second detector array detects respective times of arrival $t_1$ and $t_2$ of the first recoil electron $e_1$ and the second recoil electron $e_2$, and comprises an array of photocathodes.

5. The apparatus of claim 4 wherein the photocathodes are formed of cesium iodine.

6. The apparatus of claim 1 wherein the incident radiation is uncollimated.

7. The apparatus of claim 1 wherein the detection chamber is annular forming a hollow inner opening to accept a patient for detecting within the chamber radiation emitted from radioisotopes ingested by the patient.

8. The apparatus of claim 1 wherein the detecting apparatus is used to detect characteristic nuclear gamma-rays emitted from material when subjected to radiation.

9. A method for detecting the incoming direction of incident radiation incident in a medium containing a high Z converter molecule from which the origin of the radiation can be located, comprising the steps of:
   a) converting the radiation into particles by collision of the radiation with a molecule at a point A, resulting in production of a photon which scatters at an angle $\theta_1$, and a recoil electron $e_1$ and initial scintillation light at time $t_0$, and wherein said photon collides with another molecule at a point B, resulting in absorption of said photon and production of a second recoil electron $e_2$;
   b) in a first detector determining $t_0$;
   c) in a second detector detecting the position and time of arrival of at least one of said electrons, whereby said angle $\theta_1$, may be calculated and thus the direction of the incoming radiation; and
   d) calculating the angle $\theta_1$ and thus the direction of the incoming radiation.

10. The method of claim 9 including the step of determining the energies $E_1$ and $E_2$ of the two recoil electrons, $e_1$ and $e_2$, respectively and summing $E_1$ and $E_2$ to determine the energy $E_R$ of the radiation, and wherein if more than two scatters occur with resultant energies $E_3, E_4, \ldots$, then $E_2$ is replaced by $E_2, E_3, E_4 \ldots$.

11. The method of claim 10 wherein the angle $\theta_1$ is determined in accordance with the equation:

$$\cos(\theta_1) = 1 - m_e \frac{(E_R - E_2)}{E_R E_2}$$

where $m_e$ is the mass of the electron and energies $E_1$ and $E_2$ and points A and B are all measured in said medium.

12. The method of claim 10 wherein:
   the first detector comprises a first array of photodetectors;
   the second detector comprises a second array of photodetectors;
   the energies $E_1$ and $E_2$ are detected by the second array of photodetectors which produce currents $I_1$ and $I_2$, when electrons $e_1$ and $e_2$, respectively, are incident thereon and wherein the transverse locations of the points A and B are determined by calculating a centroid of currents generated during detection at times of arrival $t_1$ and $t_2$ of the electrons $e_1$ and $e_2$, respectively; and wherein the scintillation light is detected by the first array of photodetectors.

13. A method of detecting incident nuclear radiation comprising the steps of:
   a) containing converter molecules in a chamber;
   b) contacting said molecules with a photocathode;
   c) colliding said molecules with said radiation a drift region within said chamber formed by a relatively weak electric field to generate electrons and scintillation light from the collision between said incident nuclear radiation and said molecules;
   d) accelerating said electrons in a high electric field gain region formed adjacent said photocathode in which said molecules are in a gaseous state and to cause said electrons to collide with said molecules to produce a plurality of UV photons, many of which impinge on said photocathode to produce a plurality of photoelectrons thereby multiplying the number of photoelectrons detected; and
   e) detecting the scintillation light with photomultiplier tubes.

14. The method of claim 13 wherein said photocathode comprises an array of conductive pads covered by a photoconductor and including the step of integrating the current produced at each pad by production of photoelectrons to determine the energy of said radiation.

15. The method of claim 14 further including calculating the centroid of the pad current to determine the direction of the incident radiation.

16. The method of claim 13 wherein:
   the radiation is uncollimated,
   the collision of the molecules with the radiation produces a primary electron and a scattered photon and scintillation light, and
   the scattered photon in turn collides with a molecule and produces a secondary electron; and
   the method further includes the step of determining the respective energies, positions and times of detection of the primary and secondary electrons plus the time of occurrence of the scintillation light;
from which the energy, and the direction of the radiation which generated the primary electron is determined.

17. Apparatus for detecting the incoming direction of incident radiation from which the origin of the radiation can be located comprising:
   a) a detection chamber containing a volume of converter molecules, and wherein, upon collision of incident radiation with a molecule at a point $X_1Y_1Z_1$, a photon is produced which scatters at an angle $\theta_1$, along with a first recoil electron $e_1$ and initial scintillation light at time $t_0$, and wherein said photon, in turn, collides with another molecule at a point $X_2Y_2Z_2$, resulting in absorption of said photon and production of a second recoil electron $e_2$;
   b) a first detector array exposed to said volume of molecules for determining $t_0$;
   c) a second detector array exposed to said volume of molecules for detecting the time of arrival, of at least one of said electrons whereby said angle $\theta_1$ may be calculated and thus the incoming radiation direction;
   d) light guides disposed within said volume of molecules and adjacent said first detector array for enhancing collection of scintillation light; and
   e) a processor responsive to said first and second detector arrays for calculating the angle $\theta_1$.

18. The apparatus of claim 17 wherein said light guides are comprised of optical fibers which absorb the scintillation light at a first wavelength $\lambda_1$ and re-emit light at a second wavelength $\lambda_2$.

19. The apparatus of claim 18 wherein $\lambda_1 < \lambda_2$.

20. The apparatus of claim 18 wherein the optical fibers are comprised of orthogonally disposed fiber arrays.

21. The apparatus of claim 17 including a drift region between said second detector array and said points of collision where said electrons drift before being detected at the second detector array and wherein said first detector array is disposed adjacent said drift region.

22. The apparatus of claim 21 including a gain region between the drift region and the second detector array in which the electrons are accelerated and collide with said molecules to produce UV photons which impinge on the second detector array to produce photoelectrons.

23. The apparatus of claim 17 wherein the second detector array detects the times of arrival, $t_1$ and $t_2$, of the first and second recoil electrons, respectively, and comprises an array of photocathodes.

24. The apparatus of claim 23 wherein the photocathodes are formed of cesium iodine.

25. The apparatus of claim 17 including a collimator for shielding the first detector array from electroluminescence produced by said electrons.

26. A method for detecting the incoming direction of incident radiation incident in a medium containing a high Z converter molecule from which the origin of the radiation can be located, comprising the steps of:
   a) converting the radiation into particles by collision of the radiation with a molecule at a point A, resulting in production of a photon which scatters at an angle $\theta_1$, and a first recoil electron $e_1$ and initial scintillation light at time $t_0$, and wherein said photon collides with another molecule at a point B, resulting in absorption of said photon and production of a second recoil electron $e_2$;
   b) in a first detector determining $t_0$;
   c) in a second detector detecting the time of arrival of one of said electrons, whereby said angle $\theta_1$, may be calculated and thus the direction of the incoming radiation;
   d) shielding the first detector from electroluminescence produced by said electrons; and
   e) calculating the direction of the incoming radiation in response to the first and second detector.

27. The method of claim 26 wherein:
   the first and second recoil electrons have energies $E_1$ and $E_2$, respectively;
   the total energy of the radiation, $E_R$, is the sum of $E_1$ and $E_2$;
   the angle $\theta_1$ is determined in accordance with the equation:

$$\cos(\theta_1) = 1 - m_e \frac{(E_R - E_2)}{E_R E_2}$$

where $m_e$ is the mass of the electron and $E_1$, $E_2$ and points A and B are all measured in said medium.

28. A method of detection incident nuclear radiation comprising the steps of:
   a) containing converter molecules in a chamber;
   b) contacting said molecules with a photocathode;
   c) colliding said molecules with said radiation in a drift region within said chamber formed by a relatively weak electric field to generate electrons and scintillation light from the collision between said incident nuclear radiation and said molecules;
   d) accelerating said electrons in a high electric field gain region formed adjacent said photocathode in which said molecules are in a gaseous state and to cause said electrons to collide with said molecules to produce a plurality of UV photons, many of which impinge on said photocathode to produce photoelectrons, thereby multiplying the number of photoelectrons detected;
   e) detecting the scintillation light with photomultiplier tubes; and
   f) shielding the photomultiplier tubes from electroluminescence produced by said electrons.

29. The method of claim 28 wherein said photocathode comprises an array of conductive pads covered by a photoconductor and including the step of integrating the current produced at each pad by production of photoelectrons to determine the energy of said radiation.

* * * * *

UNITED STATES PATENT AND TRADEMARK OFFICE
CERTIFICATE OF CORRECTION

PATENT NO : 5,665,971
DATED     : September 9, 1997
INVENTOR(S): Min Chen et al.

It is certified that error appears in the above-identified patent and that said Letters Patent is hereby corrected as shown below:

Column 1, insert before the first paragraph:

"This invention was made with government support under Contract Number DE-AC02-76CH00016 awarded by the U.S. Department of Energy. The government has certain rights to the invention."

Signed and Sealed this

Twenty-fourth Day of March, 1998

Attest:

BRUCE LEHMAN

Attesting Officer

Commissioner of Patents and Trademarks